United States Patent [19]

Braman et al.

[11] Patent Number: 5,278,389
[45] Date of Patent: Jan. 11, 1994

[54] WELDING APPARATUS

[75] Inventors: David P. Braman, North Kingstown; James T. Pepper, Coventry; Anthony Marcotrigiano, East Providence, all of R.I.

[73] Assignee: Crafford Precision Products Co., Riverside, R.I.

[21] Appl. No.: 943,060

[22] Filed: Sep. 10, 1992

[51] Int. Cl.[5] ............................................. B23K 9/12
[52] U.S. Cl. .................................. 219/125.1; 219/75
[58] Field of Search .................. 219/51, 52, 125.1, 75; 59/22

[56] References Cited

U.S. PATENT DOCUMENTS 3,355,876 12/1967 Oettinger et al. ........................ 59/22
3,841,088 10/1974 Crafford et al. .
4,388,513 6/1983 Brastow et al. .

*Primary Examiner*—Clifford C. Shaw
*Attorney, Agent, or Firm*—Salter, Michaelson & Benson

[57] ABSTRACT

Arc welding apparatus for use in conjunction with conventional link forming apparatus is operable for welding the closed ends of a link after it is formed. The electrode is mounted on a swinging arm which presents the electrode from the front of the assembly and positions the electrode substantially over the top of the link for welding thereof. The vertical, horizontal and angular positions of the electrode are adjustable by means of threaded adjustment knobs. A shield and gas tube are mounted adjacent to the tip end of the electrode and move simultaneously with the electrode into position over the link during a welding operation.

24 Claims, 3 Drawing Sheets

WELDING APPARATUS

BACKGROUND OF THE INVENTION

The instant invention relates to welding apparatus and more particularly to welding apparatus for use in conjunction with automatic link forming apparatus.

In making jewelry, it is conventional to attach ornaments or findings to a chain by taking a small diameter U-shaped wire, placing a ring attached to the ornament over the free ends of the wire and forming the wire into a closed link. The closed ends of the wire are then permanently joined by either soldering or welding to prevent them from separating.

Heretofore, there have been known in the art link forming apparatus which are operable for automatically forming the U-shaped wire workpieces, presenting them for attachment to a chain or finding and closing the open ends of the wire around the chain or finding. One such machine is disclosed in the U.S. Pat. No. to Crafford, et al, 3,841,088. This apparatus forms the U-shaped workpieces from a continuous length of wire stock and feeds the workpieces to a workpiece holder for holding of the bight of the U-shaped workpiece. A chain or other finding is manually placed over the free ends of the workpiece and a camming head is then actuated into engagement with the free ends of the wire bending the ends into a closed loop or link. The link is then ejected from the holder and another workpiece is presented for attachment and closure. The ejected link can then be soldered or welded in a separate operation.

There have also been known in the art welding apparatus which operate in conjunction with the conventional link forming apparatus to automatically weld the ends of the link after closure thereof. Such apparatus is disclosed in the U.S. Pat. No. to Brastow, et al, 4,388,513. This apparatus positions a movable welding head adjacent to the link forming apparatus and it is adapted to move the electrode thereof to and from the workpiece holder via a linkage assembly which is actuated by a solenoid. A complete cycle for forming and welding a link comprises the following steps: presenting the workpiece for closure, actuating the camming head to descend and bend the free ends of the workpiece into a closed link, retracting the camming head, actuating the electrode of the welding head to the workpiece and positioning it a selected distance therefrom, moving a shield into position in front of the workpiece and ionizing the air around the workpiece by directing a selected gas around the workpiece. Once the proper ionization level is reached a welding arc travels from the electrode to the workpiece to effect the weld. The electrode is then retracted, the shield removed and the workpiece is released and a new workpiece is presented at the workpiece holder.

Although the device disclosed in the Brastow patent is effective for automatically forming the welds, there are several disadvantages which will become apparent. It is pointed out that the electrode head of the Brastow device is presented from the rear of the workpiece holder. Rear presentation often interferes with larger and odd shaped finding or ornaments which must be positioned adjacent the workpiece holder for attachment to the link. It has been found that the large findings often block the forward travel of the electrode head thereby preventing the welding operation. Rear presentation of the electrode head also prevents welding of odd shaped wire stock, such as half-round stock and flat stock. Because of the shape of the stock, an electrode which is presented from the rear of the workpiece holder must weld through the thickest dimension of the wire. Welding through the thickest dimension of the wire requires increased electrical discharge. It has been found that the increased electrical discharge often disfigures or disintegrates the rearward portions of the link before the weld can travel through to the forward portions of the link. The inability to weld half-round and flat stock is a significant disadvantage in the current marketplace because use of these types of linking materials is becoming more and more popular.

SUMMARY OF THE INVENTION

The instant invention provides improved welding apparatus for use in conjunction with conventional link forming apparatus. The electrode is mounted on a swinging arm which presents the electrode from the front of the assembly and positions the electrode substantially over the top of the link.

The welding apparatus of the instant invention is mounted on top of the head portion of a conventional link forming apparatus and it is operable for automatically welding the closed ends of the workpiece together after the link is formed. The welding apparatus comprises an elongated electrode having a tip end, an electrode block assembly for supporting the electrode, a L-shaped pivot arm supporting the electrode block assembly and a push-type solenoid for pivoting the arm. The elbow of the pivot arm is mounted in a rotatable bushing which is supported in a clevis bracket. The terminal end of the solenoid shaft communicates with the first end of the pivot arm for forward movement of the pivot arm. The electrode block assembly comprises a mounting block, an electrode holder, a shield and a gas tube. The electrode holder is received in a vertical bore in the mounting block and it is vertically adjustable by means of a threaded adjustment knob. The mounting block is connected to the pivot arm by a threaded fastener. The shank of the fastener is extended through an aperture in the end of the pivot arm and into a bore which extends horizontally into the mounting block. The threaded fastener is rotatable with respect to the pivot arm and is operable for adjusting the angular or front-to-back position of the electrode over the top of the closed ends of the workpiece. The shank of the threaded fastener is also axially adjustable by means of a threaded adjustment knob for lateral or side-to-side position of the electrode over the closed ends of the workpiece.

The gas tube is received through a bore in the shield and is then received in a vertical bore which extends upwardly into the mounting block. Gas is delivered to the gas tube via a gas line fitting which communicates with the vertical bore receiving the gas tube. The discharge end of the gas tube directs a flow of selected gas around the tip of the electrode.

In operation, the solenoid operates to move the pivot arm between a retracted position wherein the electrode is retracted away from the workpiece and a welding position wherein the tip end of the electrode is positioned substantially vertically over the top of the ends of the workpiece and is spaced from the workpiece. Forward motion of the pivot arm is controlled by a stop block assembly including a threaded stop and a coil spring mounted on the top thereof. The threaded stop is vertically adjustable by rotating a knob portion thereof to raise or lower the position thereof.

The welding apparatus operates to weld the closed ends of the link from a position substantially over the top thereof. This vertical presentation of the electrode permits odd shaped findings to be welded in the apparatus without interfering with the travel of the electrode. The orientation of the electrode also permits the apparatus to weld odd shaped wire stock such as half-round and flat stock.

Accordingly, it is an object of the instant invention to provide welding apparatus for use in conjunction with conventional link forming apparatus.

It is another object to provide welding apparatus which welds over the top of the closed ends of the links.

It is still another object to provide a welding apparatus in which the movement of the electrode is vertically, horizontally and angularly adjustable.

It is yet another object to provide welding apparatus for welding half-round and flat wire stock.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
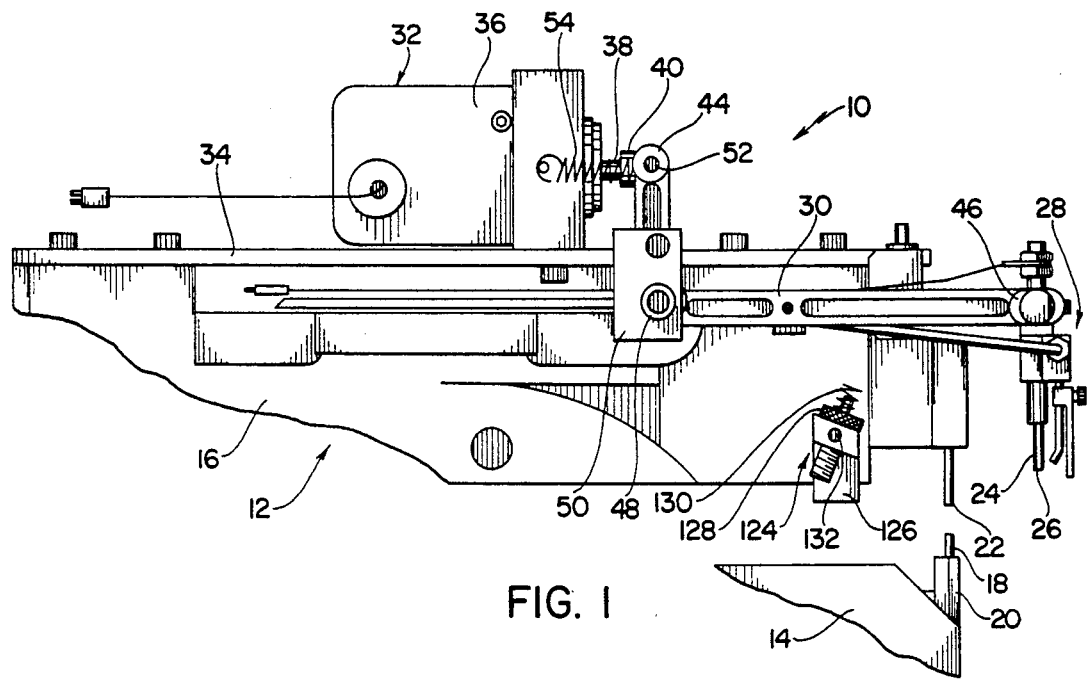
FIG. 1 is a side elevational view of the welding apparatus of the instant invention with the electrode in the retracted position.
Figure 2:
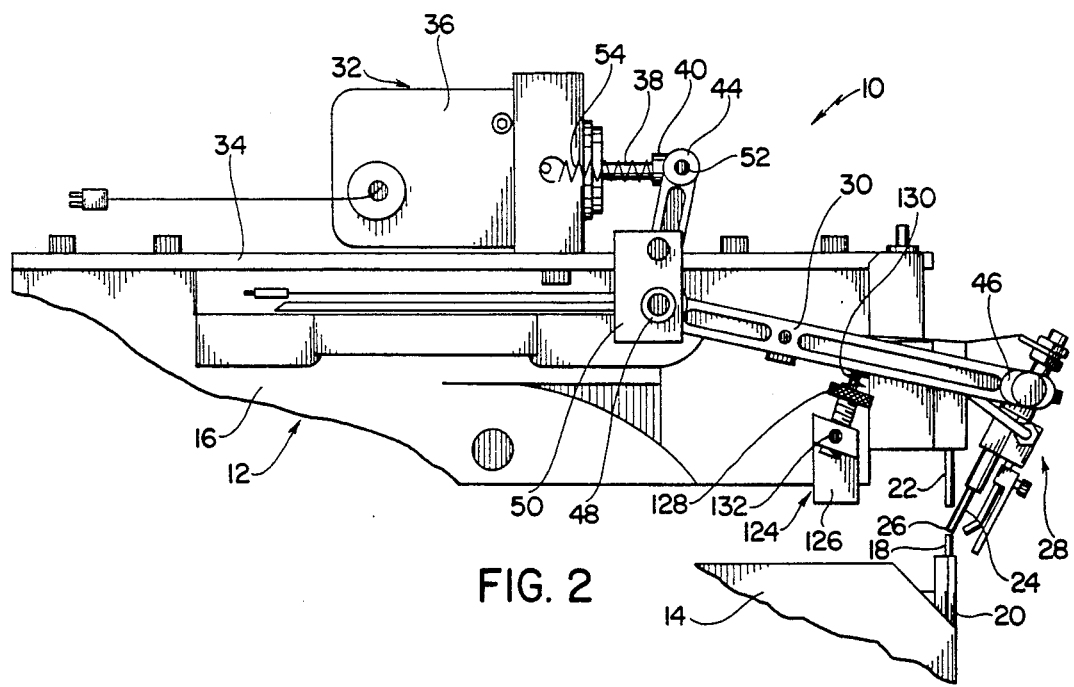
FIG. 2 is a similar view with the electrode in the welding position.
Figure 3:
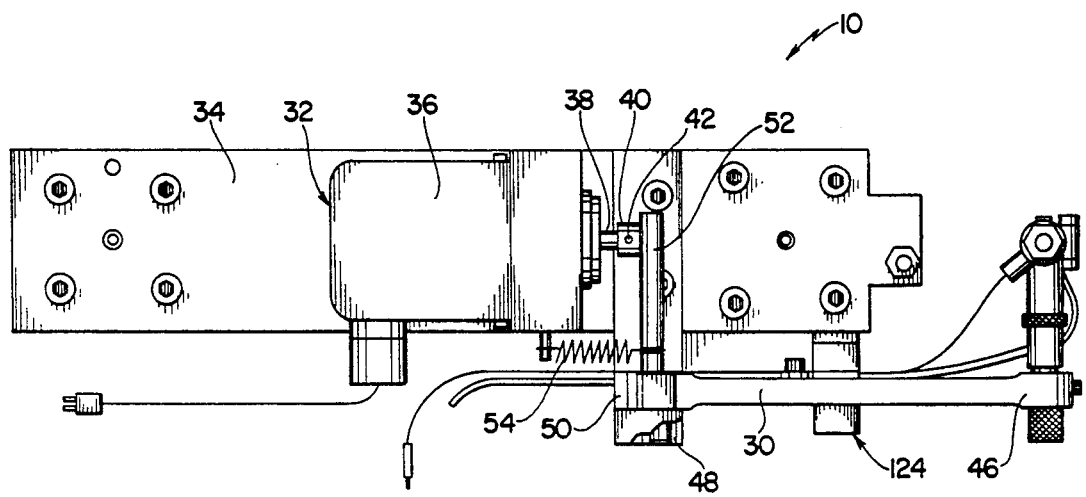
FIG. 3 is a top elevational view thereof.
Figure 4:
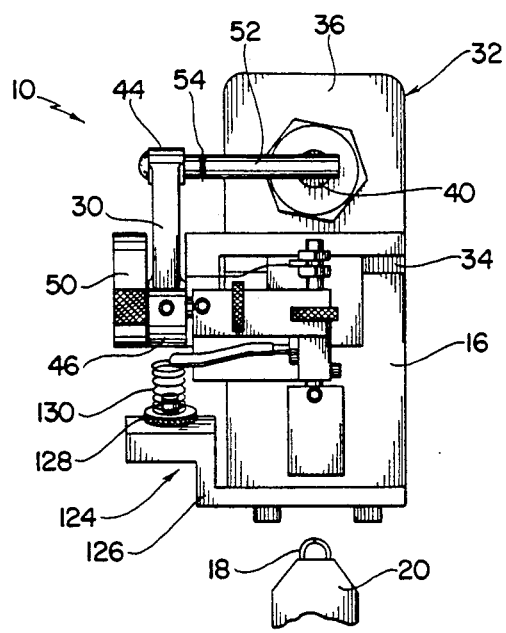
FIG. 4 is a front view thereof.

Referring now to the drawings, and particularly to FIGS. 1 through 4, the welding apparatus of the instant invention is generally indicated at 10 and is illustrated in combination with a conventional link forming apparatus generally indicated at 12. With reference to FIGS. 1 and 2, the link forming apparatus 12 includes a base portion 14 and a head portion 16 which is supported thereabove. A workpiece 18 comprising a length of metallic wire bent in a U-shape configuration is directed through a magazine (not shown) in the base 14 and is presented at the top of the workpiece holder 20. The workpiece 18 is presented in the holder 20 so that the bight portion is captured within the holder 20 and the two free ends thereof extend upwardly. A ring attached to an ornament or finding (not shown) can then manually be placed over one of the free ends so that it will be captured when the ends are bent together. A forming head 22 mounted on the head portion 16 is then brought down so that a curved surface at the bottom of the forming head 22 contacts the free ends of the workpiece 18 and bends them together (FIG. 4). The forming head 22 is then brought upwardly into the position shown in FIGS. 1 and 2 with the workpiece 18 ready for removal from the workpiece holder 20 so that another workpiece can be presented.

The welding apparatus 10 of the instant invention is mounted on top of the head portion 16 of the link forming apparatus 12 and is operable for automatically welding the closed ends of the workpiece 18 together after the link is formed. The welding apparatus 10 comprises an elongated electrode 24 having a tip end 26, an electrode block assembly generally indicated at 28 for supporting the electrode 24, a pivot arm 30 supporting the electrode block assembly 28 and a solenoid generally indicated at 32 for pivoting the arm 30.

An elongated base plate 34 is mounted to the top of the head portion 16 of the link forming apparatus 12 and supports the entire welding apparatus 10. The solenoid 32 is mounted on top of the base plate 34 and comprises a 24 volt push-type solenoid having a body portion 36, a shaft 38 and a stop collar 40 which is mounted on the shaft 38. The stop collar 40 is axially adjustable along the length of the shaft 38 to selectively limit the rearward movement of the pivot arm 30. The stop collar 40 includes a set screw 42 for locking the collar 40 in position.

The pivot arm 30 comprises an L-shaped arm having a first end 44 and a second end 46. The elbow of the arm 30 is pivotally mounted in a rotatable bushing 48 which is supported in a clevis portion of a bracket 50 which extends outwardly from the side of the base plate 34 (FIG. 3). A push bar 52 is mounted on the first end 44 of the pivot arm 30 and communicates with the terminal end of the solenoid shaft 38 for forward movement of the pivot arm 30. Rearward movement of the pivot arm 30 is accomplished through a coil spring 54, one end of which is anchored to the solenoid 32 and the other end of which is anchored to the push bar 52. The second end 46 of the pivot arm 30 supports the electrode block assembly 28.

Figure 5:
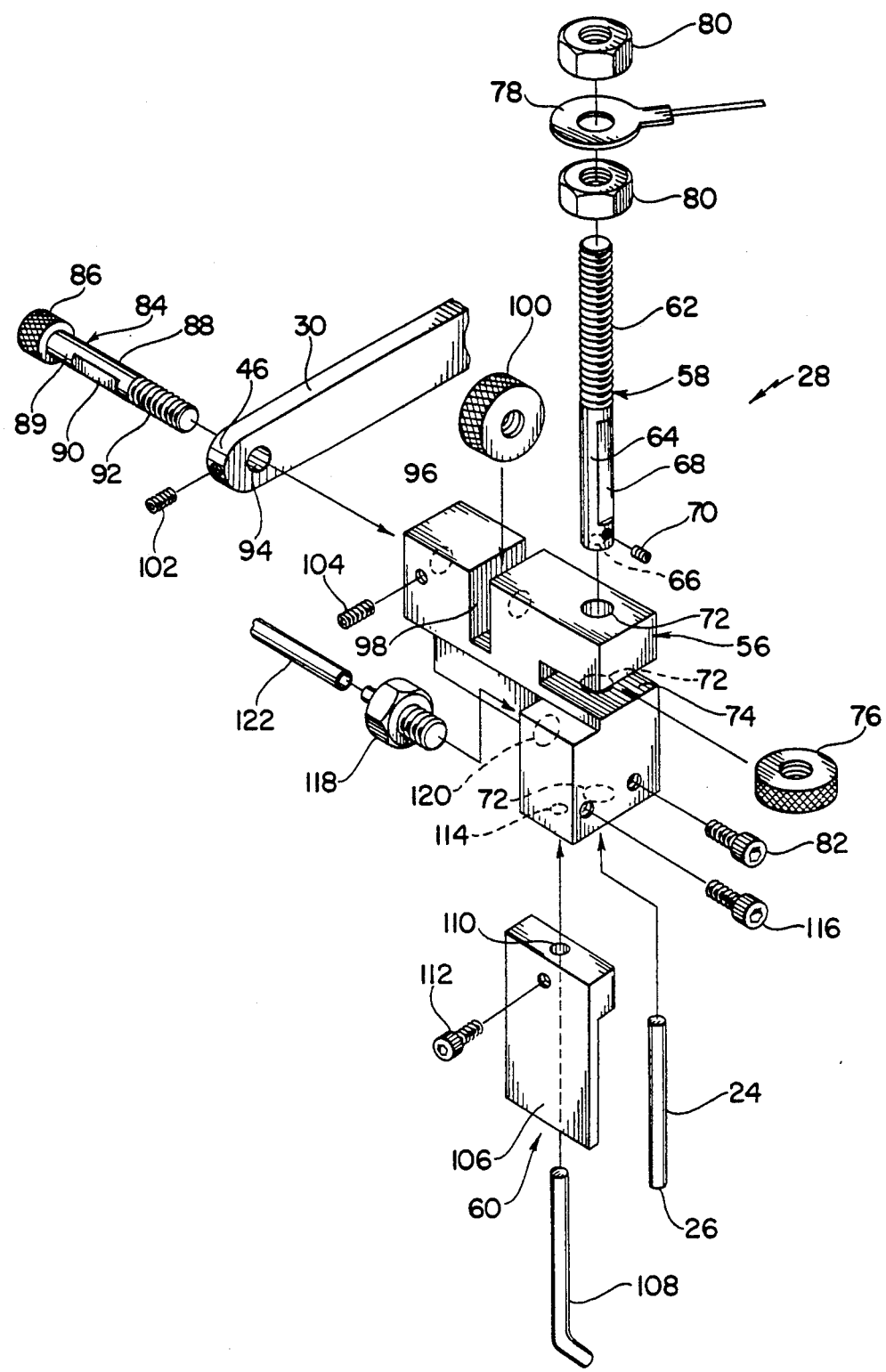
FIG. 5 is an exploded perspective view of the electrode block assembly.

Referring now to FIG. 5, the electrode block assembly 28 comprises a mounting block generally indicated at 56, an electrode holder generally indicated at 58, and a shield and gas tube sub-assembly generally indicated at 60. The electrode holder 58 comprises an elongated rod having a threaded segment 62 and a rounded segment 64. The rounded segment 64 further includes an axial bore 66 (shown in broken lines) and a flat surface 68 formed thereon. The electrode 24 is telescopingly received into the bore 66 in the electrode holder 58 so that the tip end 26 extends outwardly therefrom. The electrode 24 is maintained in position by a cap screw 70 which extends into the bore 66. The electrode holder 58 is received in a bore 72 which extends vertically through the mounting block 56. The bore 72 extends through a horizontal slot 74 which is formed in the side of the mounting block 56. The threaded portion 62 of the electrode holder 58 is threaded through an adjustment knob 76 positioned in the slot 74 so that it projects upwardly out of the top of the mounting block 56. An electrical lead 78 is fastened to the threaded portion 62 of the electrode holder 58 by two threaded nuts 80 positioned above and below the lead 78. The electrode holder 58 is axially adjustable within the vertical bore 72. In this regard, rotation of the adjustment knob 76 adjusts the vertical spaced position of the tip end 26 of the electrode 24 over the closed ends of the workpiece 18. A cap screw 82 extends through the side of the block 56 and engages with the flat portion 68 of the electrode holder 58 to lock the electrode holder in position within the block.

The mounting block 56 is mounted to the second end 46 of the pivot arm 30 by a threaded fastener generally indicated at 84. The threaded fastener 84 includes an enlarged head 86 and a segmented shank 88 having a rounded segment 89 adjacent the head 86, a center segment with a flat surface 90 formed thereon and a threaded end segment 92. The shank 88 of the fastener 86 is extended through an aperture 94 in the end of the pivot arm 30 and into a bore 96 which extends horizontally into the mounting block 56. The bore 96 extends through a vertical slot 98 which is formed in the top of the mounting block 56. The threaded segment 92 of the shank 88 is threaded through an adjustment knob 100 mounted in the slot 98 and rests in the innermost portion of the bore 96.

The rounded segment 89 of the threaded fastener 84 is rotatable with respect to the pivot arm 30 and is operable for adjusting the angular or front-to-back (see FIG. 2) position of the electrode 24 over the top of the closed ends of the workpiece 18. A set screw 102 extends through the front of the pivot arm 30 and engages with the rounded portion 89 of the shank 88 to lock the angular position of the shank 88. The shank 88 of the threaded fastener 84 is axially adjustable within the horizontal bore 96. In this regard, rotation of the adjustment knob 100 adjusts the lateral or side-to-side position of the electrode 24 over the closed ends of the workpiece 18. A cap screw 104 extends through the front of the block 56 and engages with the flat surface 90 on the center segment of the shank 88 to lock the mounting block 56 and electrode 24 in position.

The shield and gas tube sub-assembly 60 comprises a shield 106 formed in the shape of an inverted L and a length of copper gas tubing 108. The gas tube 108 is received through a bore 110 which extends vertically through the horizontal leg portion of the shield 106. The tube 108 is locked into the bore 110 by a cap screw 112 which extends through the front of the shield 106. The gas tube 108 is then received in a vertical bore 114 (broken lines) which extends upwardly into a head portion of the mounting block 56. The gas tube 108 is secured into this bore 114 by another cap screw 116 which extends through the side of the mounting block 56. To deliver gas to the gas tube 108, a gas line fitting 118 is received into another bore 120 (broken lines) which extends horizontally into the head portion of the mounting block 56 and communicates with the vertical bore 114 receiving the gas tube 108. A gas line hose 122 is received onto the opposing side of the gas line fitting 128. When assembled with the mounting block 56, the discharge end of the gas tube 108 is positioned adjacent the tip end 26 of the electrode 24 and the shield 106 is positioned in front of the gas tube 108 and electrode tip 26. The gas tube 108 operates to direct a flow of selected ga around the tip of the electrode 24 and the shield 106 blocks view of the welding arc when effected. The gas hose 122 and the electrical lead 78 running to the electrode holder 58 are fastened together and run along the side of the pivot arm 30.

In operation, the solenoid 32 operates to move the pivot arm 30 between a retracted position (FIG. 1) wherein the electrode 24 is retracted away from the workpiece 18 and a welding position (FIG. 2) wherein the tip end 26 of the electrode 24 is positioned substantially vertically over the top of the ends of the workpiece 18 and is spaced approximately 0.005 inch to 0.010 inch from the workpiece 18. As described previously, the retracted position of the pivot arm 30 is controlled by a stop collar 40 mounted on the solenoid shaft 38. Forward motion of the pivot arm 30 is controlled by a stop block assembly generally indicated at 124 which is mounted to the bottom of the head portion 16 of the link forming apparatus 12. The stop block assembly 124 comprises a mounting bracket 126, a threaded stop 128 and a coil 130 spring mounted on the top of the threaded stop 128. The threaded stop 128 is vertically adjustable by rotating a knob portion thereof to raise or lower the position thereof. A set screw 132 is provided for locking the stop 128 in position. The spring 130 on the top of the stop 128 prevents jarring of pivot arm 30 when it strikes the top of the stop and thereby permits smooth movement of the pivot arm 30 into the welding position. The threaded stop 128 is utilized primarily as a rough adjustment mechanism when the electrode 24 is first installed in the welding apparatus. The vertical adjustment knob 76 on the electrode block assembly 28 functions as a fine adjustment for positioning the tip of the electrode the proper distance from the workpiece and for repositioning the electrode as the tip wears from use.

A complete cycle for forming and welding a link with the apparatus of the instant invention comprises the following steps: presenting the workpiece 18 for closure, actuating the forming head 22 to descend and bend the free ends of the workpiece into a closed link, retracting the forming head 22, pivoting the electrode 24 into position over the top of the workpiece 18 and displacing the air around the workpiece by directing a selected gas around the workpiece. Once the air is displaced a welding arc travels from the tip end 26 of the electrode 24 to the workpiece 18 to effect the weld. The electrode 24 is then pivoted rearwardly, the workpiece 18 is released and a new workpiece is presented at the workpiece holder 20. The synchronized movement of the welding apparatus 10 in conjunction with the link forming apparatus 12 is accomplished through a microswitch (not shown) which is mounted on a clutch which drives the link forming apparatus 12. In this regard, retraction of the forming head 22 causes actuation of the microswitch and the solenoid 32 is thereby activated to throw the pivot arm 30.

It is seen therefore that the instant invention provides an effective welding apparatus for use in conjunction with an automatic link forming apparatus. The welding apparatus operates to weld the formed link from a position substantially over the top of the closed ends thereof. This orientation of the electrode permits odd shaped findings to be welded in the apparatus without interfering with the travel of the electrode. The orientation of the electrode also permits the apparatus to weld odd shaped wire stock such as half-round and flat stock. Welding over the top of these types of stock effects a weld through the thinnest portion of the stock and does not damage or disfigure the link. The welding apparatus also includes means for adjusting the angular, lateral and vertical positions of the electrode with respect to the closed ends of the link. It is further pointed out, that the welding apparatus of the instant invention can be used for welding other types of work pieces, such as for example jewelry articles in which a length of heavy wire stock is secured to the back thereof and bent over to form a closed loop with the outer edge of the finding. For these reasons it is believed that the welding apparatus of the instant intention represents significant advancement in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. Welding apparatus for welding a workpiece which comprises a length of wire stock having two free ends, said wire having been formed into a closed loop with the free ends thereof closely spaced in adjacent relation and being positioned so that the free ends of said workpiece define and upper extremity of said workpiece, said welding apparatus comprising:
an elongated electrode having a tip end;
means for moving said electrode including a pivot arm having a free end, means for securing said electrode to said pivot arm adjacent said pivot arm free end and means for mounting said pivot arm so that said pivot arm free end is pivotable downwardly in front of said workpiece for moving said electrode tip end from a retracted position wherein said tip end is spaced upwardly and forwardly from the workpiece to a welding position wherein said tip end is disposed immediately above the free ends of the workpiece in close proximity thereto;
means for directing a flow of selected gas around the tip end of said electrode; and
means for generating an electrical arc between the tip end of the electrode and the workpiece to effect welding of the free ends thereof.

2. In the welding apparatus of claim 1, said moving means comprising:
an electrode block assembly for supporting said electrode on said pivot arm; and
actuator means communicating with said pivot arm for moving said pivot arm so that said electrode moves between said retracted position and said welding position.

3. In the welding apparatus of claim 2, said electrode block assembly including a gas discharge tube having a discharge end which is positioned adjacent the tip end of said electrode, said discharge tube discharging said selected gas around the tip of said electrode.

4. In the welding apparatus of claim 2, said electrode block assembly including an integral shield means for shielding said arc.

5. In the welding apparatus of claim 2, said pivot arm comprising an L-shaped arm having a first end, a second end and an elbow, said elbow being pivotally mounted to said mounting means.

6. In the welding apparatus of claim 2, said actuator means comprising a push-type solenoid for moving said arm from said retracted position to said welding position, and coil spring means for moving said arm back to said retracted position.

7. In the welding apparatus of claim 6, said solenoid including adjustable stop means for selectively limiting downward and rearward travel of the pivot arm.

8. The welding apparatus of claim 1 further comprising:
adjustable stop means for selectively limiting downward and rearward travel of the pivot arm; and
threaded adjustment means for finely adjusting the vertical spacing of the tip of the electrode from the workpiece when the electrode is in the welding position thereof.

9. In the welding apparatus of claim 8, said stop means including spring means to prevent jarring of the pivot arm when contacting said stop means.

10. The welding apparatus of claim 1 further comprising:
threaded adjustment means for laterally adjusting the position of the electrode over the free ends of the workpiece when the electrode is in the welding position thereof.

11. The welding apparatus of claim 1 further comprising:
angular adjustment means for angularly adjusting the position of the electrode over the free ends of the workpiece when the electrode is in the welding position thereof.

12. In the welding apparatus of claim 1, said tip end of the electrode being spaced approximately 0.005 inch to 0.010 inch from the workpiece when said electrode is in the welding position.

13. Welding apparatus for welding a workpiece having two free ends which are positioned in closely spaced adjacent relation, said free ends being positioned so as to define an upper extremity of said workpiece, said welding apparatus comprising:
an elongated electrode having a tip end;
means for moving said electrode including a pivot arm having a free end, means for securing said electrode to said pivot arm adjacent said pivot arm free end and means for mounting said pivot arm so that said pivot arm free end is pivotable downwardly in front of said workpiece for moving said electrode tip end from a retracted position wherein said tip end is spaced upwardly and forwardly from the workpiece to a welding position wherein said tip end is disposed immediately above the free ends of the workpiece in close proximity thereto;
means for directing a flow of selected gas around the tip end of said electrode; and
means for generating an electrical arc between the tip end of the electrode and the workpiece to effect welding of the free ends thereof.

14. In the welding apparatus of claim 13, said moving means comprising:
an electrode block assembly for supporting said electrode on said pivot arm;
actuator means communicating with said pivot arm for moving said pivot arm so that said electrode moves between said retracted position and said welding position.

15. The welding apparatus of claim 13 further comprising:
adjustable stop means for selectively limiting downward and rearward travel of the pivot arm; and
threaded adjustment means for finely adjusting the vertical spacing of the tip of the electrode from the workpiece when the electrode is in the welding position thereof.

16. The welding apparatus of claim 13 further comprising:
threaded adjustment means for laterally adjusting the position of the electrode over the closed ends of the workpiece when the electrode is in the welding position thereof.

17. The welding apparatus of claim 13 further comprising:
angular adjustment means for angularly adjusting the position of the electrode over the closed ends of the workpiece when the electrode is in the welding position thereof.

18. A welding apparatus for use in connection with automatic link forming apparatus wherein the link forming apparatus includes means for forming a length of wire stock into a U-shaped workpiece having two free ends, means for presenting said workpiece for attachment to a chain or finding, and forming means for forming said workpiece into a closed loop with the free ends thereof in closed positions wherein they are in close proximity to one another and with the closed free ends defining an upper extremity of said workpiece, said workpiece having a front side, said forming means having a front side, said welding apparatus comprising:

an elongated electrode having a tip end;

mounting means for mounting said electrode on said link forming apparatus, said mounting means including a pivot arm having a free end, means for securing said electrode to said pivot arm adjacent said pivot arm free end and means for securing said pivot arm to said link forming apparatus so that said pivot arm free end is pivotable downwardly in front of said forming means and for moving said electrode tip end from a retracted position wherein said tip end is spaced upwardly and forwardly from the workpiece to a welding position wherein said tip end is disposed immediately above the closed free ends of the workpiece in close proximity thereto;

means for directing a flow of a predetermined gas around the tip end of said electrode; and means for generating an electrical arc between the tip end of the electrode and the workpiece to weld the closed free ends of the workpiece together.

19. The apparatus of claim 18 further comprising actuator means communicating with said pivot arm for moving said pivot arm so that said electrode moves between said retracted position and said welding position.

20. The welding apparatus of claim 19 further comprising an electrode block assembly for mounting said electrode on said pivot arm, said block assembly including a gas discharge tube having a discharge end which is positioned adjacent the tip end of said electrode, said discharge tube discharging said selected gas around the tip of said electrode.

21. In the welding apparatus of claim 20, said electrode block assembly including an integral shield means for shielding said arc.

22. The welding apparatus of claim 18 further comprising:

adjustable stop means for selectively limiting downward and rearward travel of the pivot arm; and threaded adjustment means for finely adjusting the vertical spacing of the tip of the electrode from the workpiece when the electrode is in the welding position thereof.

23. The welding apparatus of claim 18 further comprising:

threaded adjustment means for laterally adjusting the position of the electrode over the closed free ends of the workpiece when the electrode is in the welding position thereof.

24. The welding apparatus of claim 18 further comprising:

angular adjustment means for angularly adjusting the position of the electrode over the closed free ends of the workpiece when the electrode is in the welding position thereof.

* * * * *